US012053749B2

(12) United States Patent
Wu et al.

(10) Patent No.: US 12,053,749 B2
(45) Date of Patent: Aug. 6, 2024

(54) MIXING APPARATUS AND METHOD OF OPERATION

(71) Applicant: Commonwealth Scientific and Industrial Research Organisation, Acton (AU)

(72) Inventors: Jie Wu, Clayton South (AU); Bon Nguyen, Clayton South (AU); Dean Harris, Clayton South (AU); Lachlan Graham, Clayton South (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 508 days.

(21) Appl. No.: 16/632,011

(22) PCT Filed: Jul. 17, 2018

(86) PCT No.: PCT/AU2018/050743
§ 371 (c)(1),
(2) Date: Jan. 17, 2020

(87) PCT Pub. No.: WO2019/014709
PCT Pub. Date: Jan. 24, 2019

(65) Prior Publication Data

US 2020/0230559 A1 Jul. 23, 2020

(30) Foreign Application Priority Data

Jul. 17, 2017 (AU) ................................ 2017902787

(51) Int. Cl.
*B01F 27/1123* (2022.01)
*B01F 23/53* (2022.01)
(Continued)

(52) U.S. Cl.
CPC .......... *B01F 27/1123* (2022.01); *B01F 23/53* (2022.01); *B01F 27/81* (2022.01);
(Continued)

(58) Field of Classification Search
CPC .......... B01F 27/1123; B01F 2215/0422; B01F 2215/0431; B01F 23/53; B01F 27/81; B01F 33/406; B01F 33/86; B01F 35/3204
(Continued)

(56) References Cited

U.S. PATENT DOCUMENTS 2,151,146 A 3/1939 Petry
2,159,856 A 5/1939 Maclean
(Continued)

FOREIGN PATENT DOCUMENTS

AU 740860 B2 11/2001
CA 2 261 631 A 1/1999
(Continued)

OTHER PUBLICATIONS

Chinese Office Action for Chinese Patent Application No. 201880045686.2 dated Jun. 29, 2021, 21 pages.
(Continued)

*Primary Examiner* — David L Sorkin
(74) *Attorney, Agent, or Firm* — Merchant & Gould P.C.

(57) ABSTRACT

An apparatus (100) for mixing a liquid (160) containing particulates (106, 108) comprising: a vessel (102) for containing the liquid (160) with a sidewall (120) and bottom (124); an impeller (300) rotates about a substantially vertical axis (X-X), the impeller submerging below the liquid surface (162) by a distance approximately one-tenth to one-half of the liquid (129) height; at least two spaced apart blades (310) extending radially outwardly of the vertical axis, the blades including back-swept blades pitched substantially parallel to the vertical axis, at least 50% of the length of each
(Continued)

blade comprising an angled section (312) extending through a chord angle of 20 to 60 degrees to produce: an inner, upward flow region (164) along said vertical axis, a transition flow region (166) around the impeller in which liquid moves radially outwardly toward the vessel sidewall, and an outer, downward flow region (168) along the sidewall.

17 Claims, 5 Drawing Sheets

(51) Int. Cl.
*B01F 27/81* (2022.01)
*B01F 33/40* (2022.01)
*B01F 35/32* (2022.01)

(52) U.S. Cl.
CPC ........ *B01F 33/406* (2022.01); *B01F 35/3204* (2022.01); *B01F 2215/0422* (2013.01); *B01F 2215/0431* (2013.01)

(58) Field of Classification Search
USPC .................................. 366/325.92; 416/223 B
See application file for complete search history.

(56) References Cited

U.S. PATENT DOCUMENTS

| | | | | | |
|---|---|---|---|---|---|
| 2,615,698 | A | | 10/1952 | Valentine | |
| 2,697,589 | A | * | 12/1954 | Kingsley | B01F 27/1123 416/213 A |
| 3,470,265 | A | * | 9/1969 | Sprow | C07C 2/62 416/197 R |
| 3,801,075 | A | * | 4/1974 | Weis | B01F 23/234211 416/243 |
| 4,193,702 | A | * | 3/1980 | Davis | B01F 27/1123 366/265 |
| 4,264,215 | A | * | 4/1981 | Nunlist | B01F 27/1123 366/279 |
| 4,468,130 | A | | 8/1984 | Weetman | |
| 4,601,583 | A | * | 7/1986 | Amorese | B01F 27/071 366/330.1 |
| 5,160,041 | A | * | 11/1992 | Taniguchi | B01D 29/035 210/260 |
| 5,988,600 | A | * | 11/1999 | Vento | B01F 23/233 261/93 |
| 6,467,947 | B1 | | 10/2002 | Welsh | |
| 6,508,583 | B1 | * | 1/2003 | Shankwitz | B01F 27/811 366/196 |
| 8,596,858 | B2 | * | 12/2013 | Ohashi | B01F 27/9021 366/181.4 |
| 9,968,896 | B1 | * | 5/2018 | Himmelsbach | B01F 27/1123 |
| 2003/0007417 | A1 | * | 1/2003 | Miyata | B01J 19/006 366/325.92 |
| 2004/0145966 | A1 | * | 7/2004 | Kar | B01F 27/1123 366/329.1 |
| 2007/0152357 | A1 | | 7/2007 | Matsumoto | |
| 2007/0172407 | A1 | * | 7/2007 | Lobel | B01F 35/93 423/387 |
| 2009/0238033 | A1 | * | 9/2009 | Wyczalkowski | B01F 27/113 366/307 |
| 2017/0113196 | A1 | | 4/2017 | Cognart et al. | |

FOREIGN PATENT DOCUMENTS

| | | | |
|---|---|---|---|
| CN | 1318426 | A | 10/2001 |
| CN | 2465792 | Y | 12/2001 |
| CN | 2880234 | Y | 3/2007 |
| CN | 201592067 | U | 9/2010 |
| CN | 201625516 | U | 11/2010 |
| CN | 104168991 | A | 11/2014 |
| CN | 204159262 | U | 2/2015 |
| EP | 0 254 494 | A2 | 1/1988 |
| JP | 2012-223727 | A | 11/2012 |
| TW | M528789 | U | 9/2016 |
| WO | 2004/067159 | A1 | 8/2004 |
| WO | 2015/082761 | A1 | 6/2015 |

OTHER PUBLICATIONS

International Search Report and Written Opinion of the International Searching Authority for International Patent Application No. PCT/AU2018/050743 mailed Sep. 20, 2018, 9 pages.
International-Type Search Report for Australian Patent Application No. 2017902787 mailed Nov. 8, 2017, 11 pages.
"Harnessing the power of a tornado in a tank", CSIRO, 6: 1-2 (2014).
Stegink, D. et al., "Operating Experience with Improved Precipitation Agitation System", Proceedings of the 9th International Alumina Quality Workshop, 15-152 (2012).
Wu, J. et al., "Improved Mixing in a Magnetite Iron Ore Tank via Swirl Flow: Lab-Scale and Full-Scale Studies", Chemical Engineering Technology, 39(3): 505-514 (2016).
Wu, J. et al., "Gain Improved Tank Slurry Agitation via Swirl Flow Technology", E&M J, 78-81 (2016).
Wu, J. et al., "Improved viscous slurry agitation for minerals processing", Minerals Engineering, 78: 21-31 (2015).
Wu, J. et al., "Swirl flow agitation for scale suppression", International Journal of Mineral Processing, 112-113: 19-29 (2012).
Wu, J. et al., "Swirl Flow Technology for Improved Tank Agitation", Engineering and Mining Journal, 80-84 (2014).
"Improved Agitation with Swirl Flow Technology", CSIRO, 1 page (Nov. 2016).
Office Action for corresponding Brazil Patent Application No. BR112020001148-7 mailed Jun. 3, 2022, 6 pages.
Dickey et al (2004), Chapter 21—Mechanical Design of Mixing Equipment. Handbook of Industrial Mixing: Science and Practice, Edited by Edward L. Paul, Victor A. Atiemo-Obeng, and Suzanne M. Krasta ISBN 0-471-26919-0, 88pgs.

* cited by examiner

MIXING APPARATUS AND METHOD OF OPERATION

CROSS-REFERENCE

This application is a National Stage Application of PCT/AU2018/050743 filed 17 Jul. 2018, which claims the benefit of Australian provisional patent application No. 2017902787 filed 17 Jul. 2017, the contents of which are to be understood to be incorporated into this specification by this reference. To the extent appropriate, a claim of priority is made to each of the above-disclosed applications.

TECHNICAL FIELD

The present invention generally relates to an apparatus for mixing liquids or liquid with particles to form slurries and the like and a method of operation of that apparatus. The apparatus of the present invention is suitable for mixing one liquid with another or mixing liquid with particles to form both homogeneous suspensions as well as mixtures in which not all of the particles are fully suspended. The invention is intended for applications where entrainment of gas from the liquid surface during mixing is undesirable and to be avoided.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

It should be appreciated that the apparatus for mixing of the present invention has a number of applications in a wide variety of industrial processes. One such application is agitated precipitators used in the process of precipitating crystals from supersaturated liquor. Precipitators of this type are used in a number of industrial processes. The invention will hereinafter be specifically described with reference to this application but it will be readily appreciated that the scope of the invention is not limited to this particular application.

Large-scale tanks with working volumes in the range of 1000 to 5000 $m^3$ are used in the minerals processing industry to provide feed storage and in various continuous hydrometallurgical unit operations, such as leaching (digestion), precipitation, adsorption, oxidation, tailings washing and neutralization. Typically, long shafts with single or multiple impellers are used in tanks with vertical baffles to provide solids suspension and mixing. In some applications, draft tube agitators or air-lifting pipes are used.

Draft tube mechanical mixers typically provide vertical circulation of suspended solid particles by having a pumping impeller inside of the tube that reaches deep into the mixing vessel. The vessels are typically equipped with baffles to prevent scaling on the walls of the vessel. However, these baffles can inhibit or prevent rotation of the liquid inside the vessel. Even with baffles on the interior of the vessel walls, precipitate may eventually build up on the baffles and vessel walls. This build-up may require the vessel to be taken off-line periodically for cleaning of precipitate deposits.

Mixers with long impeller shafts that submerge the impeller blades far below the liquid surface may also be used. These mixers typically induce a predominantly swirling flow with a small radial velocity component, reducing the propensity for scaling at the vessel wall. However, crystals may precipitate on the slowly-rotating impeller shaft and impeller blades due to low turbulence in the vessel center. This build-up may require the vessel to be taken off-line periodically to remove precipitate deposits on the impeller assembly.

In both types of vessel, sedimentation accumulation due to solids settling on the tank bottom can lead to the agitator bogging. Scale formation often leads to increased sediment build-up, due to solids being "glued" together into large lumps by precipitates; sediments and slow moving solids near the tank wall lead to greatly increased scaling volume. Cleaning up of sediments and scale lumps require considerable tank offline time and expense.

Another method of mixing liquids and solids (known as a "Swirl Flow" mixer) is described in U.S. Pat. No. 6,467,947. This mixing apparatus contains a short impeller shaft and radial impeller blades, with the impeller blades located adjacent to the surface of the liquid. The rotational motion of the impeller blades induces a swirling motion in the vessel allowing for suspension of solid particles.

United States Patent Publication No. 20090238033A1 teaches an improvement over U.S. Pat. No. 6,467,947 in which an improved axial impeller design is used, having impeller blades pitched at approximately a 30 to 75 degree angle from a plane that is perpendicular to the rotational axis of impeller assembly to move fluid and gas in an axial and radial direction. The impellers also have a rake angle (rotated towards the rotational axis of impeller assembly) from 30 to 75 degrees. The blade design assists production of a swirling flow pattern in the liquid.

The Applicant has found that the operation of the swirl flow mixing apparatus described in U.S. Pat. No. 6,467,947 and US20090238033A1 can be difficult, particularly at start-up. During start-up of the Swirl Flow agitator, the impeller experiences a very high resistance in the liquid to developing the requisite swirling flow motion in the liquid. This results in a very high start-up torque. A high initial power consumption is therefore required for impeller designs taught in U.S. Pat. No. 6,467,947 and US20090238033A1. Such a high start-up power consumption for these types of swirl flow mixing apparatus is sometimes uneconomic when used for large-scale tanks, because the motor and electric system needs to be over-designed by a factor of 2 to 3 for start-up requirements of the system.

It would therefore be desirable to provide an improved mixing apparatus and/or method of operating said mixing apparatus that reduces the start-up power requirements for a swirl flow type agitator.

SUMMARY OF THE INVENTION

The present invention uses at least one of: a new impeller design; liquid property control; or liquid level control to reduce start-up torque of the impeller of a Swirl Flow type mixing apparatus. Reducing start-up torque aims to allow a Swirl Flow type mixer/agitator to be started using a normal sized motor capacity to drive the impeller of that mixing apparatus.

A first aspect of the present invention provides an apparatus for mixing a liquid containing particulates, the apparatus comprising:

a vessel for containing the liquid, the vessel including a sidewall and a bottom; and an impeller rotating about a substantially vertical axis, said impeller:

adapted for submerging below the liquid surface by a distance that is approximately one-tenth to one-half of the height of the liquid; and including at least two annually spaced apart blades extending radially outwardly of the vertical axis, the blades comprising back-swept blades that are pitched substantially parallel to the vertical axis, at least 50% of the length of each blade comprising an angled section extending through a chord angle of 20 to 60 degrees;

to produce (a) an inner, upward flow region located along said vertical axis, (b) a transition flow region located around the impeller in which liquid moves radially outwardly toward the vessel sidewall, and (c) an outer, downward flow region located along the sidewall.

The present invention provides a design solution to allow Swirl Flow mixing technology to operate in large-scale tanks, for example minerals processing tanks. This first aspect of the present invention provides a new Swirl Flow impeller configuration designed to reduce start-up torque of the impeller of a Swirl Flow type mixing apparatus.

The angled section on the blades is designed to reduce the flow impingement angle against the blades at the initial moment during start-up, when the agitator is simply turned on to a design speed from zero. At least 50% of the length of each blade comprises the angled section. The angled section can therefore comprise from 50 to 100% of the length of the blade. In embodiments, the angled section comprises at least 60%, preferably at least 70%, more preferably at least 80% of the length of the blade. In some embodiments, the angled section comprises from 70 to 100%, preferably from 75 to 100% of the length of the blade.

It should be understood that the chord angle is the angle between a radial line running from the vertical axis through the point of origin of the blade proximate the vertical axis and a further radial line running from the vertical axis to the distal end point of the blade. The chord angle defines the angle the blade traverses from the point of origin to the end point of the blade about a circle centered about the vertical axis.

The angled section can have a number of configurations. In embodiments, the angled section of the blades extend along at least one of:

a curve on a chord arc of 20 to 60 degrees chord angle; or a linear plane that extends through a chord angle of 20 to 60 degrees.

In those embodiments where the angled section is a linear plane, the angled section comprises a linear elongate body such as a plate, sheet, rod, strip, spoke or bar that extends through the chord angle.

In those embodiments where the angled section is curved, that curve is a chord arc having a chord angle of 20 to 60 degrees. In some embodiments, the blades of the impeller are preferably curved on a chord arc of 30 degrees chord angle. In other embodiments, the blades of the impeller are preferably curved on a chord arc of 60 degrees chord angle. However, it should be appreciated other chord angles within 20 to 60 degrees are possible. It is noted that in some embodiments, the blades of the impeller are preferably curved on a chord arc with an ideal curvature radius in the range of 0.25 to 0.4, preferably 0.30 to 0.35 of the diameter of the impeller. The height of the blades is therefore aligned substantially parallel with the vertical axis of the vessel. It is also preferred that the curved blades of the impeller have a substantially constant height and substantially constant thickness attached to said base disk with said blades. Moreover, each blade of the impeller preferably has the same length and configuration.

The blades comprise back-swept blades that are pitched substantially parallel to the vertical axis. It should be appreciated that "substantially parallel" is intended to indicate that the pitch of the blades could have some minor variation from being parallel with the central vertical axis X-X for example + or − about 5 degrees without any significant change to the function of the impeller.

The blades are annually spaced apart about the vertical axis, and preferably equally spaced apart about the vertical axis. The impeller includes at least two annually spaced apart blades. Embodiments of the impeller include 2, 3, 4, 5 or 6 blades. Preferred embodiments include 4 equally spaced apart blades.

The blades are adapted for submerging below the liquid surface by a distance that is approximately one-tenth to one-half of the height of the liquid. In preferred embodiments, the blades are adapted for submerging below the liquid surface by a distance that is approximately one-quarter to one-half of the height of the liquid. It should be appreciated that the impeller is submerged below the liquid level a small distance, for example in some embodiments half of the impeller diameter (e.g. for a 3 m diameter rotor, 1 to 1.5 m submerged depth). For some applications, it is advantageous to install the rotor in the middle of the tank liquid height, with a longer shaft. For example, for a liquid level of 30 m, the impeller is installed at 15 m submerged depth. Such deeper design will have a higher cost compared to shorter length shafts but it may provide better off-bottom solids suspension at lower power.

The blades are preferably configured to extend between a mounting point proximate to the vertical axis and an outer impeller diameter, the outer impeller diameter being from ¼ to ¾ the diameter of the sidewall of the vessel. The impeller is preferably adapted for submerging below the liquid surface by a distance that is approximately one-third of the height of the liquid.

In some embodiments, the blades further include a radial extension which extends radially outwardly of the vertical axis to the angled section, the radial extension comprising less than 50% of the length of the blade. The radial extension preferably extends from the mounting point proximate the vertical axis to the angled section. The angled section then extends from the end of the radial extension to the outer impeller diameter. The radial extension preferably extends along a linear plane which extends radially outwardly of the vertical axis. The radial extension can comprises an elongate linear body including but not limited to a plate, sheet, bar, rod, strip, spoke.

The radial extension comprises less than 50% of the length of the blade. In some embodiments, the radial extension comprises less than 40% of the length of the blade, preferably less than 30% of the length of the blade, and more preferably less than 20% of the length of the blade. In particular embodiments, the radial extension comprises from 5 to 50% of the length of the blade, preferably from 10 to 40% of the length of the blade. In some embodiments, the blade does not include a radial extension.

The impeller preferably only operates in the central region of the vessel. In embodiments, the blades of the impeller extend from a central hub that rotates about the central axis. The central hub preferably includes a connection to a shaft for rotating the impeller. The at least two blades are also preferably connected to and extend outwardly from the central hub. The central hub can have any desired configuration. In one form, the central hub is cylindrical.

The rotational speed of the impeller used to induce the flow can be selected to achieve the desired flow velocities in embodiments, the liquid velocity of the outer flow (and more preferably the flow of liquid adjacent the containing wall (outside the boundary layer)) is between about 0.3 m/s and 1 m/s. Most preferably this velocity is greater than 0.5 m/s, The maximum tangential liquid flow velocity in the inner flow is preferably about 3 times the liquid flow velocity of the outer flow.

Again, use of the impeller design of the present invention reduces the power consumption of the impeller or rotor of the apparatus on start-up. In embodiments, the input power to the impeller is less than 50% of the start-up power experienced by prior impeller designs disclosed for swirl flow generation (in particular those taught in U.S. Pat. No. 6,467,947 and US20090238033A1).

The vessel can comprise any suitable fluid containing container or tank. In embodiments, the vessel comprises a tank. A variety of tank configurations can be used. In embodiments, the tank comprises a cylindrical tank. In embodiments, the tank can have a diameter of from 5 to 20 m, preferably 10 to 15 m in diameter. The tanks are also preferably 10 to 40 m in height, more preferably 20 to 30 m in height. The volume of the tanks is typically 2000 to 5000 $m^3$ each. The residence time in the vessel is selected to ensure good mixing of the liquid and solids. In embodiments, the residence time of the feed is between 5 and 48 hrs. In some embodiments, the range of side wall (i.e. tank height) is preferably 1 to 4 times tank diameter, more preferably 1 to 3 times tank diameter. However, it should be appreciated that in other embodiments the ratio of the vessel sidewall height to the vessel diameter can be greater than 3 for particular applications. It should be appreciated that the height of liquid can be very close to side wall (tank) height.

In embodiments, the vessel includes an upper end and a lower end and comprises a generally cylindrical containing sidewall extending between an upper end and a lower end.

It should be understood that the created Swirl Flow in the liquid of the vessel comprises a stable swirling flow through the vessel characterised by (i) an outer annular region of moderate rotational flow around said vertical axis adjacent the containing wall moving from the upper end toward the lower end (i.e. a downwards flow region) so as to maintain a continuous flow of liquid over the containing side wall, (ii) a transition flow region located around the impeller in which liquid moves radially outwardly toward the vessel sidewall, and (iii) an inner core region of rapid rotational flow around said axis about the central region of the vessel moving from the lower end toward the upper end (i.e. an upwards flow region) and extending from substantially adjacent the lower end of the vessel to the impeller.

In particular embodiments, the present invention has application to vessels that have a height equal to or greater than the diameter of the vessel. The present invention has been found to provide satisfactory mixing in vessels having heights from 1 to 4 times the diameter. In some embodiments, the ratio of the vessel sidewall height to the vessel diameter is at least 3. Many prior art mixing devices are unable to provide satisfactory mixing in these configurations.

The vessel preferably has a circular cross-section. In one form of the invention the vessel includes a generally conical bottom. Such a conical base section joins the containing wall toward the lower end of the vessel. In particular embodiments, the vessel bottom is conical and has a slope of at least 45 degrees. In another form the vessel includes a generally flat base.

Embodiments of the present invention may further include a gas distributor for introducing a gas, preferably air, into the liquid during start-up procedures. That gas distributor can have a variety of forms. In some embodiments, the gas distributor comprises a gas lance located at the base of the vessel. In embodiments, for example for slurries, the vessel may further include one or more air sparging arrangements.

In embodiments, rotation of the impeller may be driven by a Soft Starter or a Variable Speed Drive. Use of a Soft Starter or a Variable Speed Drive enables rotation of the impeller to be controlled at start up, such that the impeller (and resulting Swirl Flow) can be started at a low speed and then ramped up to the design speed over a period of time, for example 1 to 10 min. In some embodiments, the impeller is variable speed, such that the flow is capable of entraining solid particles having a settling velocity of up to approximately 30 cm per minute in the liquid and the speed of the impeller is chosen to enable particles having a desired settling velocity to settle to the vessel bottom.

Some embodiments may include an additional power source for powering a motor driving rotation of the impeller. In these embodiments, a large, mobile electric power (e.g. diesel) generator with capacity 2 to 4 times larger than the electric capacity can be used to avoid start-up power limitation. This can be either installed as a permanent retrofit or as a temporal installation, with electrical connections set-up such that the tank can be temporally powered by this unit at start-up. The mobile unit can be turned off, and the "normal" motor be turned on, after some switching actions via a purposely modified electrical connections.

The use of multiple vessels (tanks) operated in parallel can allow for continuous operation.

In one specific application, the invention provides a precipitator comprising the apparatus of the first aspect of the present invention. Preferably, the input power to the precipitator is less than 20 $W/m^3$. Power inputs as low as 7 or 8 $W/m^3$ can maintain the suspension and mixing performance.

A second aspect of the present invention provides a method of mixing a liquid comprising the steps of:

providing a liquid in a vessel having an upper end, a lower end, and a substantially cylindrical containing wall extending between the upper and lower ends;

providing an impeller rotating about a substantially vertical axis, said impeller including at least two annually spaced apart blades extending radially outwardly of the vertical axis, the blades comprising back-swept blades that are pitched substantially parallel to the vertical axis, at least 50% of the length of each blade comprising an angled section extending through a chord angle of 20 to 60 degrees; the blades are submerged in said liquid to a position that is located approximately one-tenth to one-half of the distance from said upper end to said lower end; and producing a flow in the liquid with the impeller, said flow comprising (a) an inner flow along said vertical axis, moving from the lower end toward the upper end, (b) an outward flow from the impeller toward the containing wall, and (c) an outer flow along the containing wall, moving from the upper end toward the lower end.

The method of mixing a liquid according to the second aspect of the present invention may use an apparatus according to the first aspect of the present invention. Accordingly, it should be understood that the above disclosure of the first aspect of the present invention equally applies to this second aspect of the present invention.

A third aspect of the present invention provides a method of starting an apparatus according to the first aspect of the present invention, said start-up method comprising:

providing a liquid into the vessel below the level that would immerse the impeller;

providing a liquid into the vessel to immerse the impeller; and starting rotation of the impeller about the substantially vertical axis;

wherein the density of the liquid about the impeller is reduced at start-up of the impeller by at least one of:

a) introducing gas flow into the liquid for a period of time during start-up rotation of the impeller;

b) providing a liquid into the vessel below the level that would immerse the impeller prior to starting rotation of the impeller; and then subsequently providing further liquid into the vessel to progressively immerse the impeller to develop a swirling flow in the liquid; or c) introducing a viscosity modification additive into the liquid prior to start-up of rotation of the impeller to increase the viscosity of the liquid, thereby developing a swirling flow in the liquid comprising (a) an inner, upward flow region located along said vertical axis, (b) a transition flow region located around the impeller in which liquid moves radially outwardly toward the vessel sidewall, and (c) an outer, downward flow region located along the sidewall.

In this third aspect of the present invention, the properties of the liquid the impeller experiences (i.e. is immersed in) are modified for start-up, for example by reducing the liquid level, or by introducing air bubbles or a viscosity modifier in order to reduce torque loading on the impeller, and thus assist start-up of the mixing apparatus.

In those embodiments where the liquid level in the vessel is provided below the impeller, the liquid level in the vessel is preferably progressively increased back to the desired liquid level in the vessel after a swirling flow is sufficiently developed. That progressive introduction of liquid can take place slowly or gradually over a specified time frame. For example, in some embodiments, the vessel is progressively filled with liquid for a duration that may range from 10 min to 10 hrs, preferably from 20 mins to 5 hrs, more preferably from 1 to 4 hrs. The viscosity of the liquid can also be modified by filling the vessel with a solids free liquid for start-up.

In those embodiments where gas flow is introduced, that gas flow is preferably introduced using a gas distributor. That gas distributor can have any suitable form. In some embodiments, the gas distributor comprises an air lance located at or proximate the base of the vessel. In other embodiments, the gas distributor comprises an air sparging arrangement. The gas flow is preferably introduced into the liquid prior to starting rotation of the impeller.

In those embodiments where a viscosity modifier is added to the liquid, the viscosity modification additive is preferably added in concentrations of 50 to 100 ppm. A variety of viscosity modification additives can be added depending on the composition of the liquid introduced into the vessel. In embodiments, the viscosity modification additive comprises Carbopol polymer or carboxymethyl cellulose (CMC), Acti-Gel (from Active Minerals). However, it should be understood that other viscosity modification additives could be used. It should be appreciated that once swirling flow is sufficiently developed, production liquid is fed into the vessel after a swirling flow.

A fourth aspect of the present invention provides a method of starting an apparatus according to the first aspect of the present invention, said start-up method comprising:

providing a liquid into the vessel below the level that would immerse the impeller;

starting rotation of the impeller about the substantially vertical axis;

providing further liquid into the vessel to progressively immerse the impeller to develop a swirling flow in the liquid comprising (a) an inner, upward flow region located along said vertical axis, (b) a transition flow region located around the impeller in which liquid moves radially outwardly toward the vessel sidewall, and (c) an outer, downward flow region located along the sidewall.

In this fourth aspect of the present invention, the agitator motor is started when the liquid level in the vessel is below the impeller height in the vessel. The liquid level is progressively increased to immerse the impeller and then over the impeller after a swirling flow is sufficiently developed.

The liquid level in the vessel is preferably progressively increased back to the desired liquid level in the vessel after a swirling flow is sufficiently developed. That progressive introduction of liquid can take place slowly or gradually over a specified time frame. For example, in some embodiments, the vessel is progressively filled with liquid for a duration that may range from 10 min to 10 hrs, preferably from 20 mins to 5 hrs, more preferably from 1 to 4 hrs.

The viscosity of the liquid can also be modified by filling the vessel with a solids free liquid for start-up. Examples of suitable solids free liquid include hot caustic liquid used for tank cleaning operation in alumina refinery, or liquid acid. Once the swirl flow is established, with stable current reading at the motor, the working production slurry stream (with solids) can be fed into the tank.

If required, a gas flow, preferably air, can be introduced into the liquid for a period of time during start-up rotation of the impeller. Similarly, if required, a viscosity modification additive can be added into the liquid prior to start-up of rotation of the impeller to increase the viscosity of the liquid. Both additional steps assist modifying the properties of the liquid the impeller experiences for start up.

In those embodiments where a viscosity modifier is added to the liquid, the viscosity modification additive is preferably added in concentrations of 50 to 100 ppm. A variety of viscosity modification additives can be added depending on the composition of the liquid introduced into the vessel. In embodiments, the viscosity modification additive comprises Carbopol polymer or carboxymethyl cellulose (CMC), Acti-Gel (from Active Minerals). However, it should be understood that other viscosity modification additives could be used. It should be appreciated that once swirling flow is sufficiently developed, production liquid is fed into the vessel after a swirling flow.

It should be appreciated that production liquid is fed into the vessel after a swirling flow is sufficiently developed, for example once the swirl flow is in steady state motion. The additives effect will disappear in some time, without any long term impact on the production in the processing tank train.

A fifth aspect of the present invention provides a method of starting an apparatus according to the first aspect of the present invention, said start-up method comprising:

providing a liquid into the vessel to immerse the impeller;

starting rotation of the impeller about the substantially vertical axis;

introducing gas flow into the liquid for a period of time during start-up rotation of the impeller to develop a swirling flow in the liquid comprising (a) an inner, upward flow region located along said vertical axis, (b) a transition flow region located around the impeller in which liquid moves radially outwardly toward the vessel sidewall, and (c) an outer, downward flow region located along the sidewall.

In this fifth aspect of the present invention, a gas distributor can be used to introduce a gas flow (for example air, nitrogen or the like) into the liquid during the start-up period. The gas is injected into the liquid until a swirling flow is sufficiently developed in the liquid.

The gas flow is preferably introduced using a gas distributor. That gas distributor can have any suitable form. In some embodiments, the gas distributor comprises an air lance located at or proximate the base of the vessel. In other embodiments, the gas distributor comprises an air sparging arrangement. The gas flow is preferably introduced into the liquid prior to starting rotation of the impeller.

A sixth aspect of the present invention provides a method of starting an apparatus according to the first aspect of the present invention, said start-up method comprising:

providing a liquid into the vessel to immerse the impeller;

introducing a viscosity modification additive into the liquid to increase the viscosity of the liquid;

starting rotation of the impeller about the substantially vertical axis;

thereby developing a swirling flow in the liquid comprising (a) an inner, upward flow region located along said vertical axis, (b) a transition flow region located around the impeller in which liquid moves radially outwardly toward the vessel sidewall, and (c) an outer, downward flow region located along the sidewall.

In this sixth aspect of the present invention, the introduction of a viscosity modification additive leads to an increase in the viscosity to make the flow mildly laminar (as opposed to turbulent) in most applications. A small, optimum amount will reduce the initial torque loading on the impeller.

It should be appreciated that an optimum dosage of the viscosity modification additive is dependent on the composition of the liquid or slurry in the vessel. Nevertheless, in some embodiments the viscosity modification additive is preferably added in concentrations of 50 to 100 ppm. A variety of viscosity modification additives can be added depending on the composition of the liquid introduced into the vessel. In embodiments, the viscosity modification additive comprises Carbopol polymer or carboxymethyl cellulose (CMC), Acti-Gel (from Active Minerals). Again, it should be understood that other viscosity modification additives could be used.

It should be appreciated that production liquid is fed into the vessel after a swirling flow is sufficiently developed, for example once the swirl flow is in steady state motion. The additives effect will disappear in some time, without any long term impact on the production in the processing tank train.

A seventh aspect of the present invention provides an impeller for retrofitting into a vessel for containing and mixing a liquid containing particulates, the vessel including a sidewall and a bottom; the impeller including at least two annually spaced apart blades extending radially outwardly of the vertical axis, the blades comprising back-swept blades that are pitched substantially parallel to the vertical axis, at least 50% of the length of each blade comprising an angled section extending through a chord angle of 20 to 60 degrees;

wherein the impeller is retrofitted into the vessel to:

rotate about a substantially vertical axis;

be submerged below the liquid surface by a distance that is approximately one-tenth to one-half of the height of the liquid; and to produce (a) an inner, upward flow region located along said vertical axis, (b) a transition flow region located around the impeller in which liquid moves radially outwardly toward the vessel sidewall, and (c) an outer, downward flow region located along the sidewall.

It should be appreciated that the impeller of this seventh aspect of the present invention can be retrofitted into a vessel to form the apparatus described in first aspect of the present invention. It is to be understood that the features described for the first aspect of the present invention equally apply to this seventh aspect of the present invention.

It should be appreciated that Swirl Flow mixing/agitator technology provides energy efficient solutions to problems of sediment/scale build-up in large-scale tanks, typically used in mining and minerals processing. The technology allows lower cost retrofit and greenfield new design of agitator systems when compared with conventional agitator systems.

It should also be appreciated that Swirl Flow technology, including the Swirl Flow type mixing apparatus of the present invention, provides solutions to the following problems:

Build-up of inventory or scale/sediment that reduces tank on-line time, or premature failure of agitator. A Swirl Flow flow pattern reduces and preferably prevents the build-up of scale and sediment in a tank by having higher flow velocity over the side wall.

Problems with re-starting after a power outage or bogging event, because of fast settling/cementing material interaction with the agitator. The Swirl Flow agitator is typically located in the upper portion (upper half) of a tank, thus avoiding such settled material. Solid material which settles at the bottom of the vessel following a shutdown is more easily re-suspended using the flow pattern created by the Swirl Flow agitator.

Lower extraction, or over-consumption of chemicals due to poor mixing. Swirl Flow agitator provides a well-mixed liquid with good particle suspension, and better dispersion of solids compared to conventional agitators.

Wear on impeller blades. A Swirl Flow agitator has less erosion compared with conventional agitators due to lower maximum tip velocity.

Failure of long cantilever shafts, common in gas sparging operations. A Swirl Flow agitator has shorter agitator shafts compared to conventional gas spargers which can reduce bending stresses, avoiding mechanical failure.

High capital cost to replace damaged agitator system. Swirl Flow system is typically ⅓ the cost of conventional systems.

Damage to tank lining material due to movement from baffles (due to corrosion damage) used in conventional agitator systems. A Swirl Flow agitator does not include a significant number of baffles.

A significant difference between the method and apparatus of this invention and prior art mixers resides in the intentional creation of the swirling or rotational flow. In prior art devices such flow is considered undesirable and baffles have been used to prevent it being established. Additionally, in accordance with the present invention the impeller is submerged in the liquid (i.e. below the surface of the liquid). This prevents unwanted entrainment of gas from the liquid surface. The submerged mechanical rotation also prevents waves or "sloshing" on the surface of the liquid.

BRIEF DESCRIPTION OF THE DRAWINGS

The present invention will now be described with reference to the figures of the accompanying drawings, which illustrate particular preferred embodiments of the present invention, wherein.

DETAILED DESCRIPTION

Figure 1:
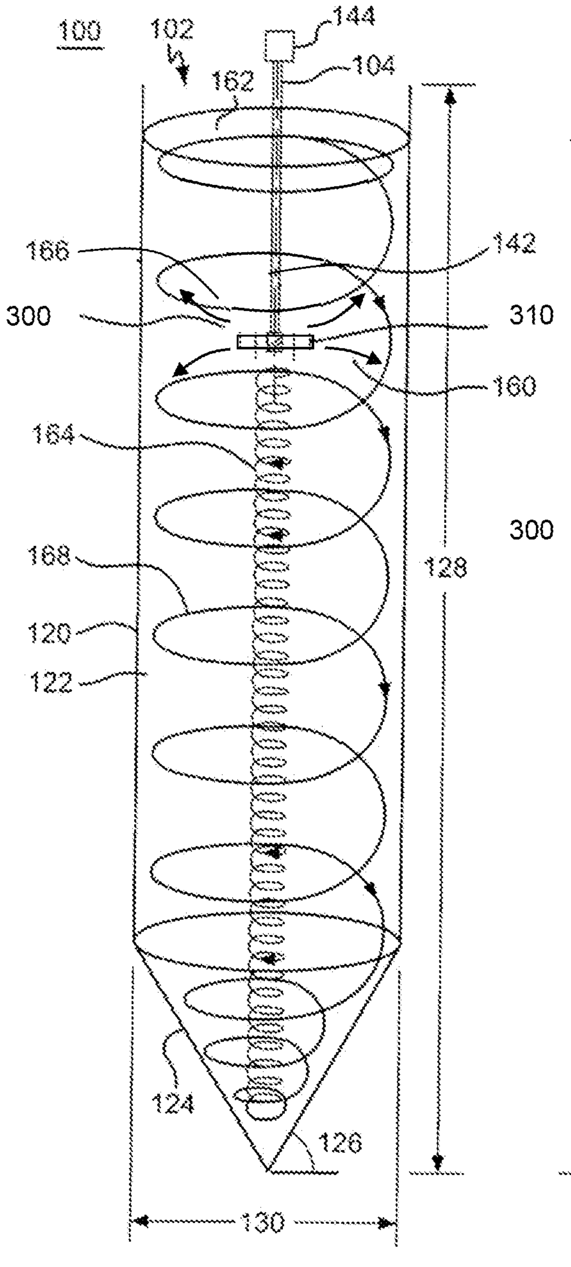
FIG. 1 is a diagrammatic view of an apparatus for mixing illustrating the orientation of the liquid flow regions.

The present invention provides a new impeller design and associated method of operation to reduce start-up torque of the impeller of a Swirl Flow type mixing apparatus. Reducing start-up torque aims to allow a Swirl Flow type mixer/agitator to be started using a normal sized motor capacity to drive the impeller of that mixing apparatus.

The concept behind swirl flow mixing and precipitation is that, in addition to the vertical velocity component for solids suspension, Swirl Flow uses a large horizontal velocity to increase the total velocity over the vessel wall. This results in improved scale suppression ability. In a Swirl Flow type mixing apparatus, a radial flow impeller near the top of the vessel draws in slurry along the vertical axis of the vessel and discharges the slurry radially outwardly with a large tangential velocity component, while also imparting a large swirl velocity (see FIGS. 1 and 2). As the slurry reaches the vessel wall it changes direction and spirals down along the vessel wall. Upon reaching the vessel bottom, the slurry spirals towards the axis of the vessel. In doing so, the swirl velocity increases due to conservation of angular momentum which requires that the product of tangential velocity and radius remains constant. The fast-swirling slurry then rises along the vessel axis and enters the agitator. Note that no guide vane or flow straighteners are used. The resulting high slurry velocities along the vessel wall result in a reduced scaling rate, which improves performance through its impact on vessel volume and operating factor.

Swirl Flow precipitation increases yield through increased operating factor and vessel volume, and the low conversion cost makes it the preferred option over replacement of a damaged draft tube. The agitator has superior re-suspension capability, which allows easy recovery from an interruption of power supply. Care must be taken to optimise cycle duration.

Slurry tanks with Swirl Flow impeller installation used in minerals processing industry typically have a tank diameter: 5 to 20 m and tank height: 10 to 40 m. The slurry mass in such tanks is very large, typically 5 to 10 million tonnes in each tank. For efficient mixing and suspending solids (typically in the range of 5 μm to 5 mm, particles of ore or product with specific gravity (SG) in the range of ~1-8, but usually SG within ~2-5), the slurry mixture is slowly swirled under the action of a Swirl Flow impeller. It should be appreciated that specific gravity in this context defines the density of a liquid or solid as compared to the density of an equal volume of water at a 4° C. and 1 atm. During normal plant conditions, such Swirl Flow agitation tanks may continue to be operated non-stop for 6 months to 2 years, with slurry product stream flowing from the first tank toward to the last tank in a typical processing tank train.

The movement of the impeller in a Swirl Flow vessel/tank may stop for many reasons, for example from a power failure, or from failure of equipment (e.g. gearbox damage) or a downstream equipment stoppage (e.g. classifiers) and other events. Stoppage is also expected for routine shutdown for descaling or sedimentation cleaning.

Restarting a Swirl Flow impeller from the stationary slurry/liquid, (sometimes with solids settled) can be difficult in these larger tanks. In prior art Swirl Flow tanks, the power consumption at the motor was found to typically exceed the limit, which can cause tripping of the power supply (e.g. rated 200 to 300 Amps), and consequently providing a high electrical damage risk.

Whilst not wishing to be limited by any one theory, the Inventors have surprisingly found that this initial high power consumption is related to the flow impact angle of the liquid on the blades of the impeller during the start-up procedure of the Swirl Flow vessel. This leads to a very high initial torque loading to the agitator shaft system (sometimes 2 to 3 times the steady-state torque loading), which results in high power consumption.

Figure 4:
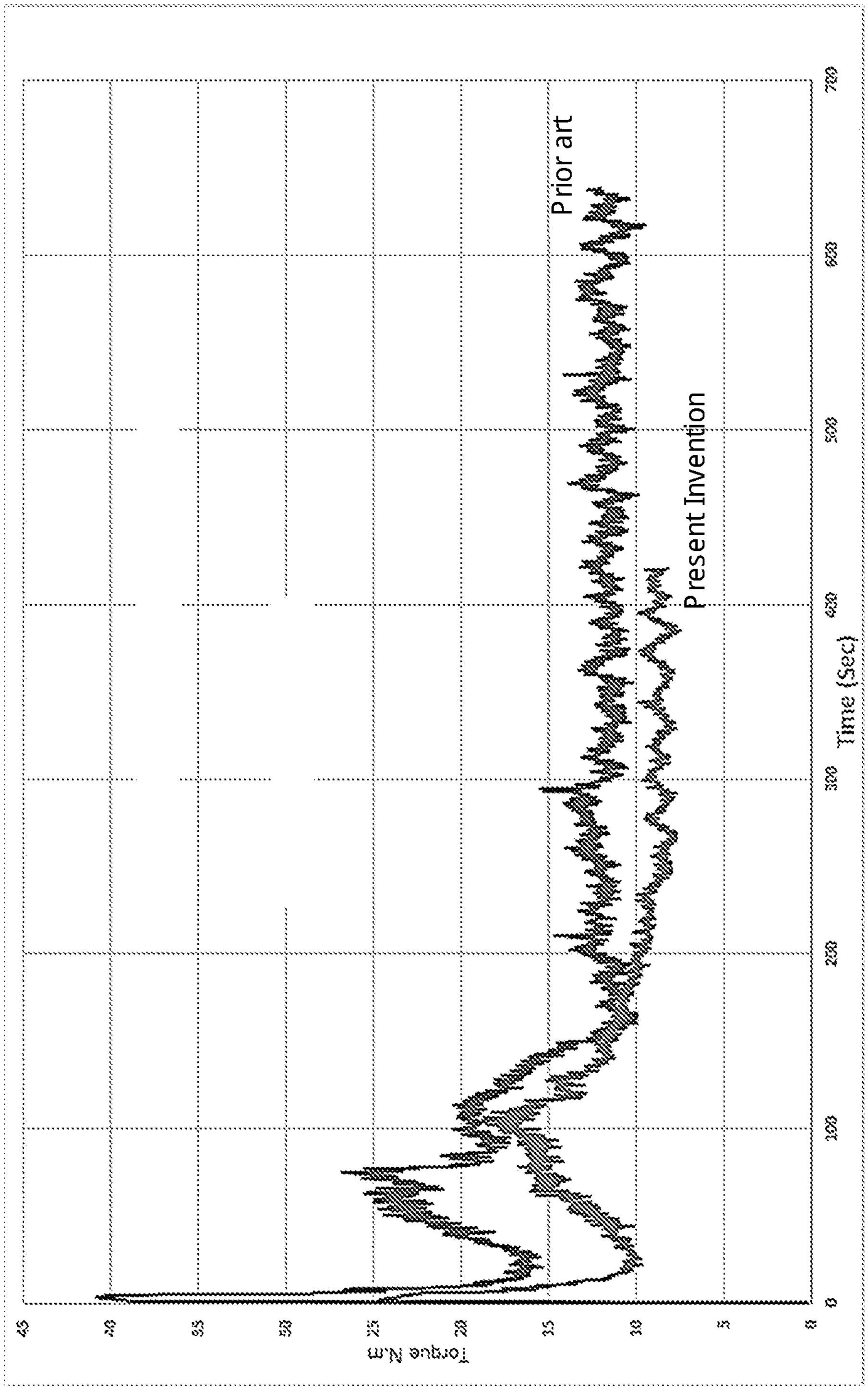
FIG. 4 provides a comparison plot of Torque (Nm) vs time for a Swirl Flow mixing apparatus using a prior art impeller and a Swirl Flow mixing apparatus using the impeller illustrated in FIG. 3.

As shown by torque vs time measurements in FIG. 4, for prior art arrangements (in accordance with Swirl Flow vessel configurations taught in U.S. Pat. No. 6,467,947) and a Swirl Flow vessel according to an embodiment of the present invention, the high initial torque gradually dissipates as the slurry mixture is fully in a swirling flow motion after reaching the design steady-state, as the relative flow impingement angle against the blades reduced significantly. The final steady-state power can be as small as ⅓ of the initial peak torque (again as shown in FIG. 4).

The Inventors discovered that this high start-up torque problem can be solved by two approaches:

1) Reduce the flow impingement angle against the blades at the initial moment during start-up, when the agitator is simply turned on to a design speed from zero; and/or
2) Reduce the slurry density the impeller experiences at start up, for example by reducing the liquid level, or by introducing air bubbles.

For the first approach of reducing the impingement angle, a new impeller design has been invented for a Swirl Flow agitator consisting of back-swept blades.

Figure 3:
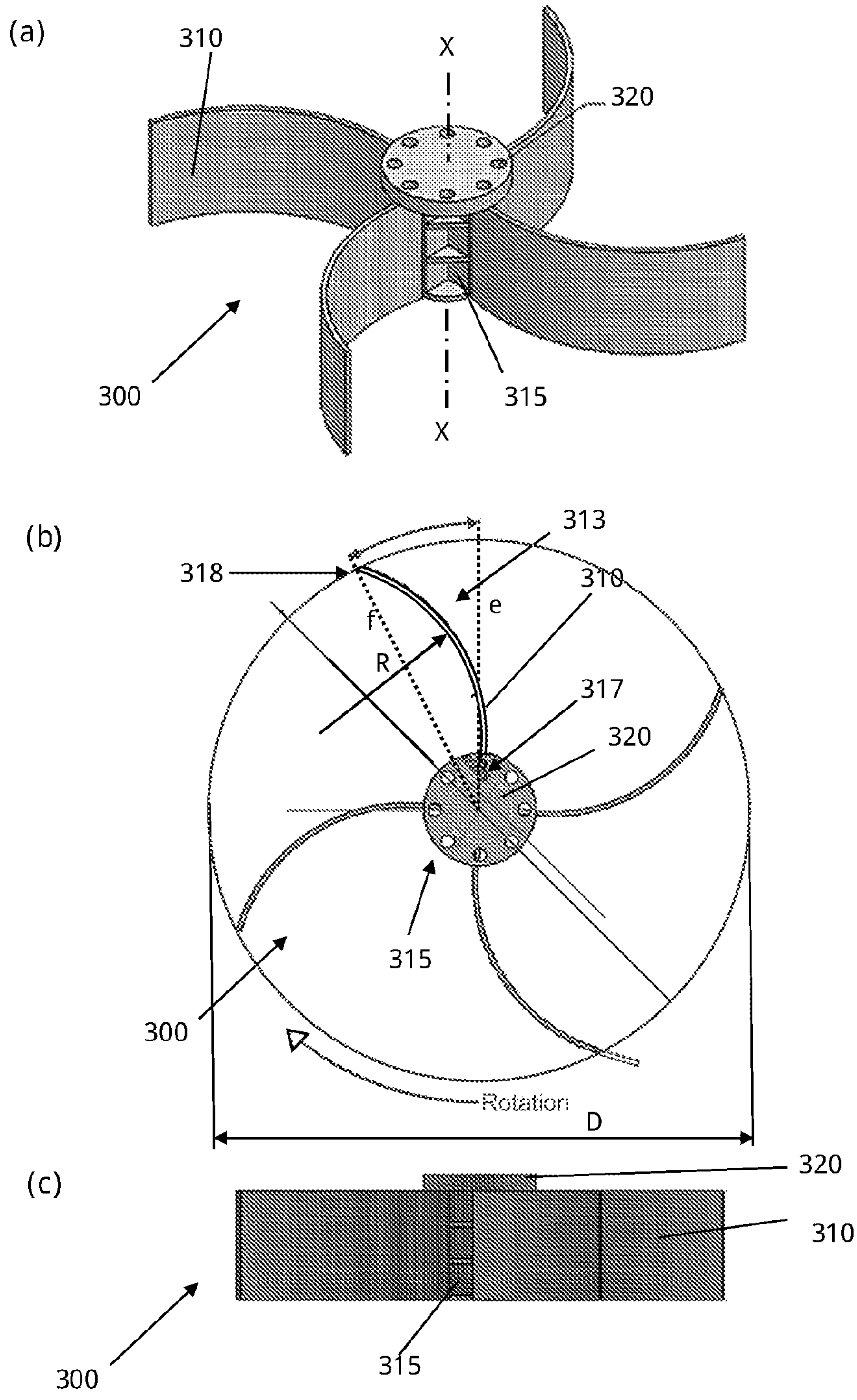
FIG. 3 provides (a) a perspective view; (b) a top view; and (c) a side view of an impeller used in embodiments of the present invention.

One embodiment of this new impeller design is shown in FIG. 3. Referring to FIG. 3, the impeller 300 comprises four annually and equally spaced apart blades 310 that extend radially outwardly (relative to central vertical axis X-X) from the central hub 315 that rotates about central vertical axis X-X. Whilst four blades 310 are shown in the illustrated embodiment, it should be appreciated that the impeller 300 could have a different number of blades 310, for example two, three, five or six blades 310 equally spaced apart around central vertical axis X-X. Each blade 310 comprises a radially curved back-swept element curved on a chord arc of 20 to 60 degree chord angle a relative to the central vertical axis X-X (which forms the angled section 313 of this blade 310). In the illustrated embodiments, the chord arc has a chord angle a of 30 degrees. However, it should be appreciated that other chord angles a are possible for the chord arc of each blade 310. As shown in FIG. 3, the chord angle a is the angle between a radial line (radius e) running from central vertical axis X-X through the attachment point (point of origin) 317 of the blade 310 and a further radial line (radius f) running from central vertical axis X-X to the distal end point 318 of the blade 310. The chord angle a defines the angle the arc traverses from the point of origin 317 to the end point 318 of the arc about a circle centered about the central vertical axis.

The curvature of the impeller blade 310 is optimised to allow the impacting angle of the slurry to be minimised as the slurry flows from center to the blade tip, when viewed in a rotating frame of reference (i.e. as seen from the blades). The ideal curvature radius R is in the range of 0.30 to 0.35 of the diameter D of the impeller 300. The blades 310 are pitched substantially parallel to the central vertical axis X-X. The height of the blades 310 are therefore substantially parallel aligned with the central vertical axis X-X of the vessel 102 and have a substantially constant height and substantially constant thickness attached to said base disk with said blades 310. It should be noted that the pitch of the blades could have some minor variation from being parallel with the central vertical axis X-X say + or − around 5 degrees without any significant affect to the function of the impeller.

The impeller 300 may contain any number of blades 310, which may be of any material, including stainless steel or any other material known to those in the pertinent art. In the illustrated embodiment, there are four impeller blades 310. The present invention contemplates any number of impeller blades, and impeller blades of any length and configuration. The length of impeller blades 310 shown in FIG. 3 may be scaled up or down, depending on the dimensions of vessel 102, the desired size of suspended particles 106, desired operating speed and other process and dimension parameters.

Figure 2:
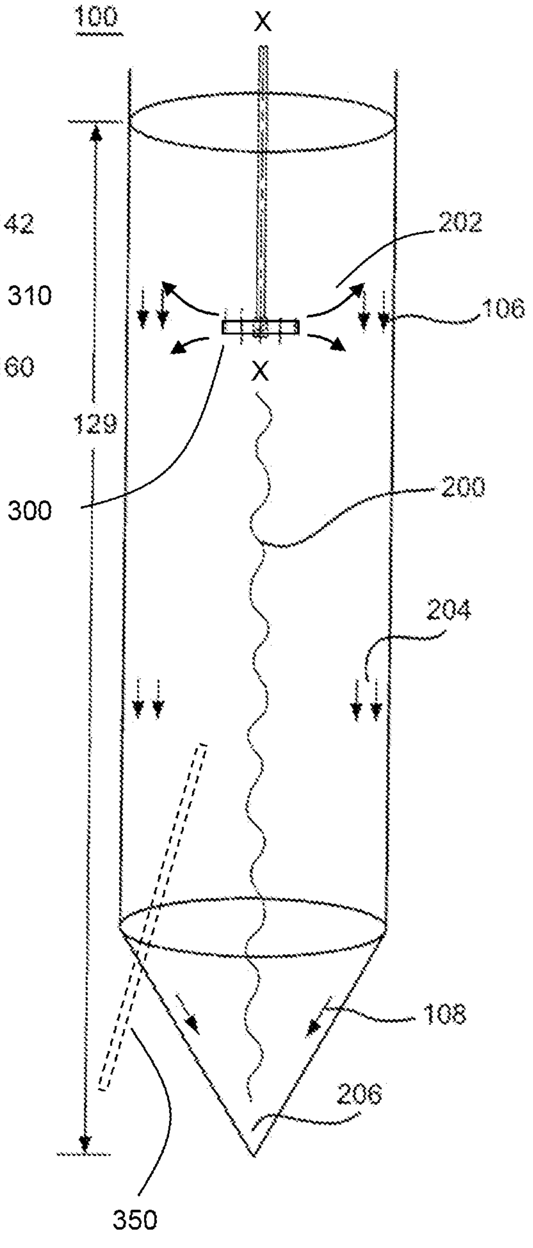
FIG. 2 is another diagrammatic view of the apparatus of FIG. 1 illustrating the movement of particles within the liquid flow regions.

The central hub 315 comprises a generally cylindrical body enclosed around each of the blades 310. In the illustrated embodiment, the blades 310 slot into and through the central hub 315 and are connected at the center of rotation of the impeller 300. The central hub 315 also includes a top hub plate 320 which includes a series of apertures allowing that plate 320 to be connected to a drive shaft (as shown in FIGS. 1 and 2). The four blades 310 are annually spaced apart around the central hub 315, with each blade 310 being mounted generally opposite to another blade 310 about the central hub 315. In some embodiments, the opposite blade mounting point on the central hub 310 may be slightly offset. In other embodiments, the mounting points of each blade 310 are arranged to be directly opposite (180 degrees) to the mounting point of another blade 310 about the central hub 315.

This design allows a dramatically lower start-up torque, when compared to the prior swirl flow impeller designs, for example as taught in U.S. Pat. No. 6,467,947. Laboratory tests were conducted to compare this design with conventional design. The test tanks of 1 m diameter and 2 to 3 m tall are made of transparent acrylic materials installed in an outer glass square tank for visual observation. The impeller 300 was mounted on the central shaft of the test tank equipped with an Ono Sokki SS101 torque and speed detector. The speed, torque and liquid level were logged using a personal computer equipped with a National Instruments data acquisition board. Sands or glass particles (typically with size in the range of 0.05 to 0.3 mm) and tap water are used in the experiments. See a laboratory test record in FIG. 4, where the torque data is plotted against the time; time zero is when the swirl agitator is started. The initial torque with a conventional Swirl Flow design (as per U.S. Pat. No. 6,467,947) of ~40 N·m was reduced to ~25 N·m for the impeller design of the present invention shown in FIG. 3. Other benefits of this impeller design: produce 10 to 50% less sedimentation depth at tank bottom for a given power input, when compared with using that disclosed in U.S. Pat. No. 6,467,947.

Figure 3A:
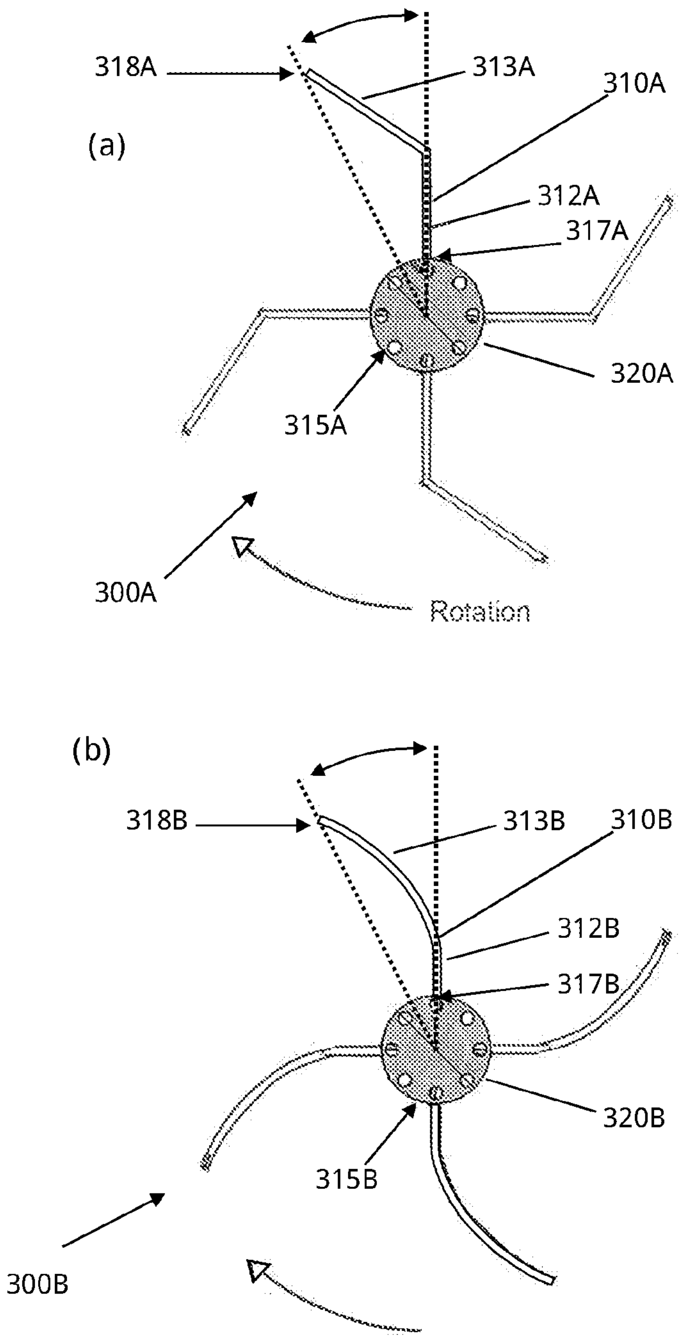
FIG. 3A illustrates two alternate impeller embodiments showing (a) a two section blade having a radial extension that extends radially outwardly of the central vertical axis to the angled section; and (b) a further two section blade having a radial extension that extends radially outwardly of the central vertical axis to the angled section.

FIG. 3A illustrates two alternate impeller embodiments 300A and 300B. The embodiments have a similar configuration as the impeller shown in FIG. 3, with the exception of the blade 310A and 310B configuration. Accordingly, it should be understood that the central hub 315 of these embodiments is as described above for impeller embodiment 300. In the embodiments in FIG. 3A, the swept back blades 310A and 310B have two part configurations, comprising a radial extension 312A, 312B and an angled portion 313A, 313B. Again, whilst four blades 310A and 310B are shown in the illustrated embodiments, it should be appreciated that the impeller embodiments 300A and 300B could have a different number of blades 310A and 310B, for example two, three, five or six blades 310A and 310B equally spaced apart around central vertical axis X-X.

The impeller 300A illustrated in FIG. 3A(a) comprises a two section blade having a radial extension 312A that extends radially outwardly of the central vertical axis X-X to the angled section 313A. In this embodiment, the angled section 313A comprises an elongate planar plate that extends along a linear plane that extends through a chord angle $\alpha$ of 20 to 60 degrees. In the illustrated embodiment, the chord angle $\alpha$ is 30 degrees.

The impeller 300B illustrated in FIG. 3A(b) comprises a two section blade having a radial extension 312B that extends radially outwardly of the central vertical axis X-X to the angled section 313B. In this embodiment, the angled section 3136 comprises a curved plate that extends along a curve on a chord arc of 20 to 60 degrees chord angle. In the illustrated embodiment, the chord angle $\alpha$ is 30 degrees.

In each of the impeller embodiments 300A and 300B, the radial extension 312A and 312B extends from the mounting point 317A, 317B proximate the central vertical axis X-X to the angled section 313A, 313B. The angled section 313A, 313B then extends from the end of the radial extension 312A and 3128 to the outer impeller diameter 318A, 318B. The radial extension 312A and 312B of the blades 310A and 310B comprise less than 50% of the length of the blades 310A and 310B. The radial extension can comprise any suitable elongate linear body such as a plate, sheet, bar, rod, strip, spoke.

It is acknowledged by the Inventors that back-swept blades and in particular curved impellers are commonly used in the mixing and fluid flow industry. However, backswept blades or curved impeller blades have not been previously used for Swirl Flow generation in an open tank without baffles for purpose of reduced start-up torque. The use of such a configuration for this purpose is not obvious or routine in Swirl Flow agitation design. In this respect, use of forward-swept blades or straight blades is a "common-sense" impeller configuration to increase the wall surface cleaning effect. However, the Inventors have surprisingly found that straight blade design or forward-swept curved impellers are actually problematic for starting up, when applied in a Swirl Flow context without baffles. It is noted that in a conventional agitator design with baffles installed in the tank, the start-up torque is roughly the same as the steady state torque.

A typical mixing apparatus incorporating the impeller 300 shown in FIG. 3 is illustrated in FIGS. 1 and 2.

FIGS. 1 and 2 illustrate a mixing apparatus 100 according to one embodiment of the present invention. The illustrated mixing apparatus 100 includes a vessel 102 and an impeller assembly 104. Vessel 102 includes a vessel sidewall 120 and a vessel bottom 124, and defines a vessel height 128 and a vessel diameter 130. Vessel sidewall 120 includes a vessel sidewall inside surface 122. Vessel bottom 124 includes a slope 126. Impeller assembly 104 comprises an agitator which includes an impeller shaft 142, a mechanical drive 144 (typically connected to an agitator motor (not illustrated)), and an impeller 300 having impeller blades 310 and hub 315 (as better illustrated in FIG. 3).

It should be appreciated that a similar set up can also be applied to a flat bottom vessel. However, in such tanks a bottom or base vane may be required to assist removal of any settled coarse solids, with the vane directing any settled or collected solids towards a drain point, typically at the side of the base or bottom of the vessel.

As best shown in FIG. 1, a liquid 160 within vessel 102 includes a liquid surface 162, an inner upward flow region 164, a transition flow region 166, and an outer downward flow region 168, The particles, if present within vessel 102, include suspended particles 106 and precipitated particles 108. As best shown in FIG. 2, the particles define upward particle movement region 200, a transition particle movement region 202, a downward particle movement region 204, and a large particle collection region 206.

As used herein and in the claims, the term "settling velocity" means the vertical-axis component of the velocity at which a suspended particle, having a density greater than the surrounding liquid or solution, and that is large enough to precipitate out of the liquid or solution, moves towards the bottom of the mixing vessel. Generally, in a given liquid, larger particles may be expected to have a higher settling velocity than smaller particles of the same density. Also, generally, particles of a given size suspended in liquids having a lower density or viscosity may be expected to have a higher settling velocity than particles suspended in liquids having a higher density or viscosity. Accordingly, particles larger than the suspended particles (that is, precipitated particles 108) drop out towards the vessel bottom 124 and may be available for removal. The size and geometry of vessel 102 and the size, speed, and configuration of impeller assembly 104 may be chosen according to conventional sizing criteria in view of the present disclosure and the desired application (including liquid and particle properties). Accordingly, the components of the mixing system may be chosen, and once chosen may be operated, to achieve precipitation of a desired particle size. However, it should be appreciated that the present invention encompasses lifting and suspension of any large or small particle sizes or particles having any low or high settling velocity.

Illustrated vessel 102 is cylindrical in shape (with a circular cross section), and it may have any vessel height 128 and any vessel diameter 130. Preferably, the vessel height 128 is at least three (3) times the value of the vessel diameter 130. The particular dimensions may be chosen according to well-known design principles according to the parameters of the liquid(s), particulate, and purpose of the desired application. The vessel sidewall 120 and vessel bottom 124 may be made of any material, including, but not limited to, stainless steel. Vessel sidewall 120 and vessel bottom 124 may also be made of any other material known in the relevant art. Vessel sidewall 120 may be attached to vessel bottom 124 in any way, including, but not limited to welding, riveting, or any other method known in the relevant art.

In the embodiment shown in FIGS. 1 and 2, vessel sidewall inside surface 122, and all other parts of vessel 102 do not have baffles. The lack of baffles may help prevent scaling from building up on vessel sidewall inside surface 122. The present invention is not, of course, limited to vessels that lack baffles.

Vessel 102 may be of any volume that is appropriate for use as a precipitator for suspended particles 106. The volume of the vessel 102 is typically between 2000 to 5000 $m^3$. In one exemplary embodiment, precipitators for alumina were designed with vessel 102 volumes of approximately 64 L, 76 L, 2000 L, 120000 L, 230000 L, and 530000 L. In another embodiment, coal slurry mixers were designed with vessel 102 volumes of approximately 19 L, 380 L, and 22.8 million L.

The vessel bottom may be of any shape. In the preferred embodiment shown in the figures, the vessel bottom 124 is conical in shape and has a vessel bottom slope 126 of at least forty-five (45) degrees. In embodiments in which the vessel bottom is conical, vessel bottom slope 126 may be any angle, including zero degrees (flat), between zero and forty-five degrees, or greater than forty-five degrees.

Impeller assembly 104 includes impeller 300 as described above. It should be appreciated that the impeller could also comprise impeller embodiments 300A and 300B illustrated in FIG. 3A.

The impeller 300 is of an impeller design, in which liquid 160 may be drawn upwards towards and through impeller blades 310. Some of liquid 160 may, of course, be propelled through radially. Impeller blades 310 are connected to the lower end of impeller shaft 142 and annually spaced apart approximately at equidistant radial locations about impeller shaft 142. Impeller blades 310 may be contained in a one-piece assembly for attachment to the lower end of impeller shaft 142, or they may be individually attached to the lower end of impeller shaft 142.

In the illustrated embodiment, the torque transmitted by mechanical drive 144 to impeller shaft 142 is transmitted from the shaft to a hub plate 320 and hub 315 (FIG. 3). Hub plate 320 may be welded to impeller shaft 142, or it may incorporate a keyway or set screw to prevent rotation of hub plate 320 relative to impeller shaft 142. In another exemplary embodiment, hub 315 incorporates welded or cast ears for attachment of impeller blades 310 to hub plate 320. In other embodiments, impeller blades 310 are welded or bolted to hub plate 320. The lower end of impeller shaft 142 may protrude below impeller blades 310, reaching a lower depth in liquid 160 than the blades.

Mechanical drive 144 may be any mechanical drive known in the pertinent art that may be adapted to rotate impeller shaft 142 and impeller blades 310 to the desired speed, such as a gear box, a belt drive, hydraulic drive and the like. Mechanical drive 144 is coupled to the upper end of impeller shaft 142.

Use of an axial pumping impeller assembly 104 may make possible suspension of suspended particles 106 for particles up to around 100 microns in size or for particles having a settling velocity of up to approximately 30 cm per minute. By varying the rotational speed of the impeller assembly 104, the lifting forces for solid suspended particles 106 may be changed. By adjusting these lifting forces, this may allow suspension of suspended particles 106 of desired sizes or having desired settling velocities only. This may allow the mixing apparatus to be used to classify particle sizes or settling velocities.

Liquid 160 may be any carrier medium for suspended particles 106, according to the particular process to which the present invention is employed. Liquid surface 162 is the highest point that liquid 160 reaches in vessel 102. In one preferred embodiment, impeller blades 310 are submerged one-third (½) of the distance from liquid surface 162 to vessel bottom 124 (the height of the liquid 129). In other embodiments, impeller blades 310 are submerged to distances between one-tenth (⅒) to one-half (½) of the distance from liquid surface 162 to vessel bottom 124 (the height of the liquid 129). Impeller blades 310 may also be submerged to other depths, depending on the desired flow characteristics of liquid 160 in vessel 102.

Liquid 160 includes an upper flow region 164, a transition flow region 166, and a downward flow region 168. The upward flow region 164 may have both an axial (upward, substantially along the axis of impeller shaft 142) and tangential (rotating substantially about the axis of impeller shaft 142) velocity component to its motion. Liquid 160 moves through upward flow region 164 towards the impeller blades 310. In one preferred embodiment, the velocity of the center of upward flow region 164 is higher than at the outer edges of upward flow region 164, in both the axial component and the tangential component of the velocity. The relationship between the velocities of various portions of the upward flow region 164 may vary depending on the dimensions of vessel 102 and impeller assembly 104, as well as the rotational speed of impeller blades 310.

The transition flow region 166 may have axial, tangential, and radial (moving from the center of vessel 102 towards the vessel sidewall 120) velocity components. As can be seen in FIG. 1, liquid 160 may have velocity components in an arc, moving upwards towards liquid surface 162, outwards towards vessel sidewall 120, and/or downwards towards the base 124.

The downward flow region 168 may have axial, tangential, and radial velocity components to its motion. In one preferred embodiment, the velocity of the center of downward flow region 168 is higher than at the outer edges of downward flow region 168, in both the axial component and the tangential component of the velocity. The relationship between the velocities of various portions of the downward flow region 168 may vary depending on the dimensions of vessel 102 and impeller assembly 104, as well as the rotational speed of impeller blades 310. The entire downward flow region 168 may move in a fast, tangential motion, moving about the impeller shaft axis, while at the same time moving downward. This rapid tangential and axial motion in downward flow region 168 may help to reduce or eliminate scaling at the vessel sidewall 120.

In an exemplary embodiment, a method and apparatus are provided for suspending and classifying solid particles up to around 100 microns in size or having settling velocities of up to approximately 30 cm per minute, in tall cylindrical vessels, using an axial up-pumping impeller, and equipped with a conical vessel bottom.

In this exemplary embodiment, impeller blades 310 are submerged in liquid 160 and centrally located in the upper half of liquid 160, in a vessel 102 with a vessel height 128 to vessel diameter 130 ratio greater than three (3).

In this exemplary embodiment, the rotation of impeller assembly 104 may produce three velocity components of flow in the fluid 160: axial, radial, and tangential. The radial flow velocity component is caused by the impeller rotation, and this flow may move the fluid 160 through the transition flow region 166, towards the vessel sidewall 120. The axial flow velocity component may help to move the fluid 160 from the vessel bottom 124, through the upward flow region 164, towards the impeller blades 310. The tangential flow velocity component causes rotation of the entire body of fluid 160 in vessel 102, about a central vertical axis that is substantially coincident with the impeller shaft 142 rotational axis (central vertical axis) X-X.

The motion of fluid 160 may reach a steady state condition, in which the tangential flow motion that is induced by the impeller assembly 104 produces an upward tornado-like effect in upward flow region 164. In this embodiment, the tangential angular velocity of the fluid 160 in upward flow region 164 may be greater than the tangential angular velocity in the downward flow region 168 at the vessel sidewall 120. Also, the fluid in upward flow region 164 may have an axial velocity component that exceeds the axial velocity component in downward flow region 168. This phenomenon makes it possible to lift solid suspended particles 106 from the vessel bottom 124 towards the transition flow region 166 and the liquid surface 162.

Suspended particles 106 are carried throughout upward flow region 164, transition flow region 166 and downward flow region 168, while suspended in liquid 160. Generally, suspended particles 106 follow the same velocity vectors as the portions of liquid 160 in which they are suspended. The suspended particles 106 are carried upward by the motion of liquid 160 in upward particle movement region 200, in a substantially axial direction, towards the impeller blades 310. After passing above the impeller blades 310, the suspended particles 106 are carried in transition particle movement region 202 towards the vessel sidewall 120. Once the suspended particles 106 reach downward flow region 168, they are carried in downward particle movement region 204 until they reach the vessel bottom 124. If the suspended particles 106 have grown to a size that may allow them to precipitate out of the liquid 160, they may become precipitated particles 108, which collect at the vessel bottom 124 in the large particle collection region 206. Once precipitated particles 108 settle in the large particle collection region 206, these particles may be removed from mixing apparatus 100, preferably by conventional means, to be used for other industrial purposes.

In an exemplary embodiment, suspended particles 106 begin to settle downward in downward particle movement region 204, near vessel sidewall inside surface 122. These precipitated particles 108 collect in vessel bottom 124, which preferably has a conical shape. If the precipitated particles 108 are smaller than the desired size, the particles are lifted again in upward particle movement region 200 and become suspended particles 106. This lifting and precipitating process may repeat until the precipitated particles 108 are at least the desired size, and they remain in the large particle collection region 206 near the vessel bottom 124.

In an exemplary embodiment of a crystallizer, in which the mixing process causes the size of suspended particles 106 to increase during mixing, larger precipitated particles 108 oscillate only in the large particle collection region 206 near the vessel bottom 124. The lifting force available to lift the precipitated particles 108 into upward particle movement region 200 depends on the rotational speed of the impeller assembly 104. Therefore, changing the rotational speed of the impeller assembly 104 makes it possible to discharge from mixing apparatus 100 only precipitated particles 108 of at least the desired size.

In one exemplary embodiment, the flow of liquid 160, suspended particles 106, and precipitated particles 108 is continuous. Continuous flow entails liquid 160, suspended particles 106, and precipitated particles 108 being periodically, regularly, or constantly being added and removed from vessel 102. In other embodiments, the flow of liquid 160, suspended particles 106, and precipitated particles 108 is not continuous.

In an exemplary embodiment of a waste digester, methane or other gas bubbles may be produced during the flow of liquid 160, and these gas bubbles may be collected at and/or above liquid surface 162. The flow characteristics of liquid 160 allow gas bubbles to condense into the center of liquid 160, in upward flow region 164. These condensed gas bubbles are then released to liquid surface 162, where they can be collected. This condensation of gas bubbles prevents the formation of froth at liquid surface 162, which allows for more easy collection of the gas.

In an exemplary embodiment of wastewater treatment, the instant invention can be used to mix liquids and gasses containing up to approximately three percent (3%) suspended sludge (by weight).

Start Up Operation

Further reduction in the start-up torque experienced by the impeller assembly 104 and the impeller 300 can be achieved by methods of reducing the slurry density. Several methods are proposed for reducing the slurry density:

Firstly, the liquid can be provided in the vessel below the level that would immerse the impeller 300 prior to starting rotation of the impeller 300; and then subsequently providing further liquid into the vessel 102 to progressively immerse the impeller 300 to develop a swirling flow in the liquid. In this method, the agitator motor is started when the liquid level 129 in the vessel 102 is just below the impeller 300 position. After a swirling flow is sufficiently developed in the vessel 102, the liquid level 129 is then gradually increased back to the normal operational liquid level. This is a method suitable for retrofit into a motor system with fixed shaft speed equipment, common in the minerals industry.

Secondly (in addition to and/or alternatively), gas flow can be introduced into the liquid for a period of time during start-up rotation of the impeller 300. In embodiments, an air lance 350 (FIG. 2) can be installed in the vessel 102, located at the base or bottom 124 of the vessel 102. In this method, air flow can be injected into the liquid in the vessel 102. The air lance 350 (agitator) is then turned on and left running until a swirling flow is sufficiently developed. The air flow from air lance 350 is turned off after a swirling flow is sufficiently developed in the vessel 102 (FIG. 2).

Thirdly (in addition to and/or alternatively), a viscosity modification additive could be introduced into the liquid in the vessel prior to start-up of rotation of the impeller 300 to increase the viscosity of the liquid. In this method a suitable viscosity modification additive is introduced from the top of the vessel near the drive shaft, above or below the liquid surface. The dosage of the viscosity modification additive is typically a small dosage, for example 50 to 100 ppm. This addition leads to an increase in the viscosity to make the flow mildly laminar in most applications. A small, optimum amount will reduce the initial torque loading on the impeller. The production inflow liquid can be introduced once the swirl flow is in steady state motion in the vessel. The additives effect will disappear in time, without any long term impact on the production in the processing tank train. An optimum dosage will need to be developed for a given slurry property, to avoid excessive increase in the viscosity which could cause increase of the start-up torque.

The following provides possible start-up steps following the above described methodology:

1. With an empty vessel 102 with the swirl flow agitator already installed, fill up the liquid to a liquid level 129 just below the impeller 300;
2. Turn the agitator motor on to the design speed;
3. Continue filling up the liquid level to slowly submerge the impeller 300 to the design liquid level, whilst the impeller 310 of the agitator is rotating at the constant design speed. The filling speed is adjusted for a time duration typically in the range of 10 min to 10 hrs, for vessels 102 with diameter in the range of 5 to 20 m, vessel height ~10 to 40 m.
4. Preferably, a liquid free of solids is used for start-up, e.g. hot caustic liquid used for vessel cleaning operation in alumina refinery, or liquid acid. Once the swirl flow is established, with stable current reading at the motor, the working production slurry stream (with solids) can be fed into the vessel 102.
5. If a slurry with normal solids has to be used in filling up the vessel 102, extra time (e.g. 5 to 10 hrs) should be allowed after completion of filling for re-suspension of solids, which could have settled to the vessel bottom during the filling process, initially.
6. Start-up is completed once the production slurry stream is continually flowing in and out of the vessel 102, with solids in good suspension and motor current in stable reading.
7. For a vessel 102 with slurry, lower the liquid level to below the agitator, and follow from (2).

Further reduction in the start-up torque experienced by the impeller 300 and (impeller assembly 104/agitator) can be further reduced by modifying the mixing apparatus.

In some embodiments, the agitator can be driven by a Soft Starter or a Variable Speed Drive (VSD). In this method, the Swirl Flow impeller/agitator is started at a low speed and is then sped up (ramped up) to the design speed over a period of 1 to 10 min. The inventors consider this method may be economical for relatively small vessels (tanks), with modest motor power capacity rating (for example $<50$ kW).

Figure 5:
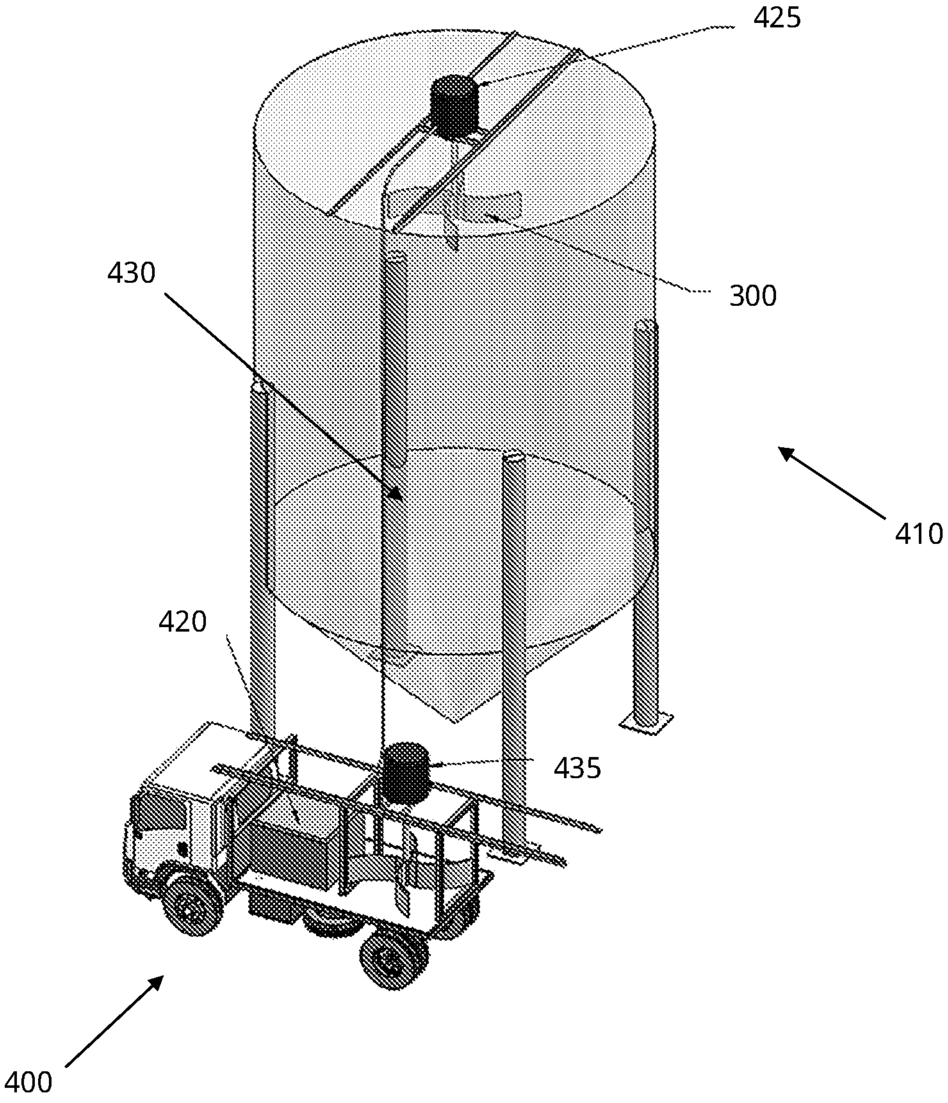
FIG. 5 provides a diagrammatic view of a portable generator arrangement that could be coupled to a swirl flow agitator to provide additional power requirements for start-up.

In other embodiments, a large, mobile electric power (e.g. diesel) generator 420 (FIG. 5), with capacity 2 to 4 times larger than the electric capacity of the existing power supply to avoid any start-up power limitation. This can be either installed as a permanent retrofit and as a temporary installation 400 (FIG. 5), with electrical connections set-up such that the tank 410 can be temporally powered by this unit (swirl drive impeller/ agitator 425) at start-up. The mobile unit 400 can be turned off, and the "normal" motor be turned on, after some switching actions via a purposely modified electrical connection 430. This approach maybe economic for sites when Swirl Flow tanks operate for a long time without stoppage (for example two years), and such temporary exercises involving a mobile power generator can be practical. It should be appreciated that this approach can also be used for tanks without existing electric power capacity equipment. The temporary installation 400 can also include a portable swirl drive impeller/ agitator 435.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. An apparatus for mixing a liquid containing particulates, the apparatus comprising:

a vessel for containing the liquid, the vessel including a sidewall and a bottom, the vessel holding the liquid therein from the bottom of the vessel up to a level of the sidewall which corresponds with a top liquid surface of the liquid when in the vessel; and an impeller rotating in a forward direction of rotation about a substantially vertical axis within the vessel and located between the level of the sidewall and the bottom, said impeller:

configured below the level of the sidewall in said vessel by a distance that is approximately one-tenth to one-half of the height of the level of the sidewall from the bottom of the vessel; and includes at least two blades equally spaced apart about the vertical axis, each blade extending outwardly of the vertical axis and being pitched substantially parallel to the vertical axis with a substantially constant height, each blade comprising a backwards-swept section comprising at least 50% of the length of each blade, wherein the backward-swept section is angled backwardly relative to the forward direction of rotation and at a chord angle of 20 to 60 degrees, wherein the chord angle is defined between a first radial line running from the vertical axis through a point of origin of the blade and a second radial line running from the vertical axis to an end point of the blade;

wherein said impeller interacts with the liquid to produce a flow pattern in the liquid within the vessel having (a) an inner, upward flow region located along said vertical axis, (b) a transition flow region located around the impeller in which liquid moves radially outwardly toward the vessel sidewall, and (c) an outer, downward flow region located along the sidewall.

2. An apparatus according to claim 1, wherein the backwards-swept section of the blades extend along at least one of:

a curved line that extends through the chord angle of 20 to 60 degrees; or a linear line that extends through the chord angle of 20 to 60 degrees.

3. An apparatus according to claim 2, wherein the backward-swept section is curved on a chord arc of 30 degrees chord angle.

4. An apparatus according to claim 2, wherein the backward-swept section of the blades of the impeller have a curvature radius in the range of 0.25 to 0.4 of the impeller diameter.

5. An apparatus according to claim 1, wherein the blades further include a radial extension which extends radially outwardly of the vertical axis to the backward-swept section, the radial extension comprising less than 50% of the length of the blade.

6. An apparatus according to claim 5, wherein the radial extension extends along a linear line which extends radially outwardly of the vertical axis.

7. An apparatus according to claim 1, wherein the blades extend between a mounting point proximate the vertical axis and an outer impeller diameter, the outer impeller diameter being from ¼ to ¾ the inner diameter of the sidewall of the vessel.

8. An apparatus according to claim 1, wherein the impeller includes a central hub including a connection to a shaft for rotating the impeller, the at least two blades connected to and extending outwardly from the central hub.

9. An apparatus according to claim 8, wherein the blades of the impeller have a substantially constant height and substantially constant thickness.

10. An apparatus according to claim 1, wherein each blade has the same length and configuration.

11. An apparatus according to claim 1, wherein the impeller causes the rotational flow to be such that the maximum tangential liquid flow velocity in the inner flow is about 3 times the liquid flow velocity of the outer flow.

12. An apparatus according to claim 1, wherein the impeller causes the rotational flow to be such that the liquid velocity of the outer flow is between 0.3 m/s and 1 m/s.

13. An apparatus according to claim 1, wherein the vessel includes an upper end and a lower end and comprises a generally cylindrical containing sidewall extending between an upper and lower ends.

14. An apparatus according to claim 1, wherein the ratio of the vessel sidewall height to the vessel diameter is at least 3.

15. An apparatus according to claim 1, wherein the vessel bottom is conical and has a slope of at least 45 degrees.

16. An apparatus according to claim 1, wherein said impeller is adapted for submerging below the top liquid surface level by a distance that is approximately one-third of the height of the liquid.

17. An apparatus according to claim 1, further including a gas distributor arranged and configured to introduce a gas into the liquid during start-up procedures.

* * * * *